(12) United States Patent
Werner et al.

(10) Patent No.: US 10,965,219 B2
(45) Date of Patent: **\*Mar. 30, 2021**

(54) IDLE RING DETECTION FOR A MULTI-OUTPUT POWER CONVERTER

(71) Applicant: Power Integrations, Inc., San Jose, CA (US)

(72) Inventors: Antonius Jacobus Johannes Werner, Cambridge (GB); Manoj Bhasin, Cambridge (GB); Matthew David Waterson, Bottisham (GB); Karl Moore, Ely (GB)

(73) Assignee: Power Integrations, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/703,440

(22) Filed: Dec. 4, 2019

(65) Prior Publication Data
US 2020/0106365 A1    Apr. 2, 2020

Related U.S. Application Data

(63) Continuation of application No. 15/612,761, filed on Jun. 2, 2017, now Pat. No. 10,554,134.

(51) Int. Cl.
*H02M 3/335* (2006.01)
*H02M 3/28* (2006.01)
*H02M 1/00* (2006.01)

(52) U.S. Cl.
CPC ....... *H02M 3/33561* (2013.01); *H02M 3/285* (2013.01); *H02M 3/33576* (2013.01); *H02M 3/33592* (2013.01); *H02M 3/33569* (2013.01); *H02M 2001/0003* (2013.01); *H02M 2001/009* (2013.01)

(58) Field of Classification Search
CPC ............ H02M 3/335; H02M 3/33507; H02M 3/33515; H02M 3/33538; H02M 3/33576; H02M 3/33592; H02M 2001/0003; H02M 2001/0009; H02M 2001/0058
See application file for complete search history.

(56) References Cited

U.S. PATENT DOCUMENTS

| | | | |
|---|---|---|---|
| 5,442,534 A * | 8/1995 | Cuk ...................... | H02M 3/005 363/16 |
| 6,552,917 B1 * | 4/2003 | Bourdillon ........ | H02M 3/33561 363/21.12 |

(Continued)

*Primary Examiner* — Thienvu V Tran
*Assistant Examiner* — Shahzeb K Ahmad
(74) *Attorney, Agent, or Firm* — Power Integrations, Inc.

(57) ABSTRACT

A controller for use in a power converter with multiple outputs includes a discharge detect circuit coupled to receive a voltage signal from a transformer winding of the power converter to output a discharge signal in response to the voltage signal. A multi-output signal process and interface block is coupled to output request signals to the output selection drive and idle ring visibility logic circuit. An output selection drive and idle ring visibility logic circuit is coupled to receive the discharge signal from the discharge detect circuit and the output request signals from the multi-output signal process and interface block. An idle ring detection circuit is coupled to one of the plurality of output switches and coupled to output an idle ring output signal to generate a next request pulse.

8 Claims, 5 Drawing Sheets

(56) References Cited

U.S. PATENT DOCUMENTS

| | | | | |
|---|---|---|---|---|
| 6,845,018 B2* | 1/2005 | Ohishi | ............. | H02M 3/33507 |
| | | | | 363/21.06 |
| 8,232,674 B2* | 7/2012 | Phadke | ................ | H02M 3/285 |
| | | | | 307/31 |
| 2005/0225176 A1* | 10/2005 | Gan | ................ | H02M 3/33561 |
| | | | | 307/31 |
| 2009/0244942 A1* | 10/2009 | Huang | ............. | H02M 3/33592 |
| | | | | 363/89 |
| 2010/0165670 A1* | 7/2010 | Piazzesi | ............ | H02M 3/33523 |
| | | | | 363/21.12 |
| 2011/0310639 A1* | 12/2011 | Hsu | ................... | H02M 3/33561 |
| | | | | 363/21.14 |
| 2014/0204625 A1* | 7/2014 | Liu | ........................ | H02M 1/08 |
| | | | | 363/21.13 |

* cited by examiner

IDLE RING DETECTION FOR A MULTI-OUTPUT POWER CONVERTER

CROSS-REFERENCE TO RELATED APPLICATIONS

This application is a continuation of U.S. patent application Ser. No. 15/612,761, filed on Jun. 2, 2017 now pending, which is incorporated in its entirety herein by reference.

BACKGROUND INFORMATION

Field of the Disclosure

The present invention relates generally to flyback converters, and more specifically, to multi-output power converters with idle ring detection/visibility.

Background

Power converters with multiple outputs and constant current (CC) and/or Constant Voltage (CV) control are of interest and widely used due to their benefits in cost, volume, and efficiency in applications that require various levels of the regulated output voltages in CV mode, as well as the controlled regulated current in CC mode. The multiple outputs are applied over multiple loads and are independently controlled based on each output load demand controlled and regulated.

In most of the multiple output converters developed so far only one output may tightly be regulated. They may require multiple secondary windings and magnetic components to be regulated independently that would increase cost and size of the power converter.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

In the context of the present application, when a transistor is in an "off state", or "off", the transistor does not substantially conduct current. Conversely, when a transistor is in an "on state", or "on", the transistor is able to substantially conduct current. By way of example, in one embodiment, a high-voltage transistor comprises an N-channel metal-oxide-semiconductor field-effect transistor (NMOS) with the high-voltage being supported between the first terminal, a drain, and the second terminal, a source. The high voltage MOSFET comprises a power switch that is driven by an integrated controller circuit to regulate energy provided to a load. For purposes of this disclosure, "ground" or "ground potential" refers to a reference voltage or potential against which all other voltages or potentials of an electronic circuit or integrated circuit (IC) are defined or measured.

In a typical configuration of a multi-output power converter, each of the multiple secondary windings, may be coupled to the respective output via a switch (e.g., transistor). Those skilled in the art will be able to appreciate that visibility of observing the transformer secondary voltage also referred to as idle ring can be very useful in increasing the overall efficiency of the power converter. Typically, in a multi-output flyback converter topology with independent enable switches/diodes for each of the outputs, the transformer secondary voltage is typically not visible. During the idle ring period, all enable switches are off and the transformer secondary winding is only capacitively coupled to the output, which hampers flyback idle ring detection and visibility. Non-visibility of the idle ring may preclude "quasi-resonant" or "valley switching" operation of the power converter, which may reduce the converter efficiency and is therefore undesirable.

As will be discussed, an apparatus and a method of detecting and observing an idle ring in a multi-output converter are disclosed in accordance with the teachings of the present invention. More specifically the embodiments of the present invention teach detecting and observing an idle ring by enabling one of the output switches coupled to the secondary windings of the power converter.

Figure 1:
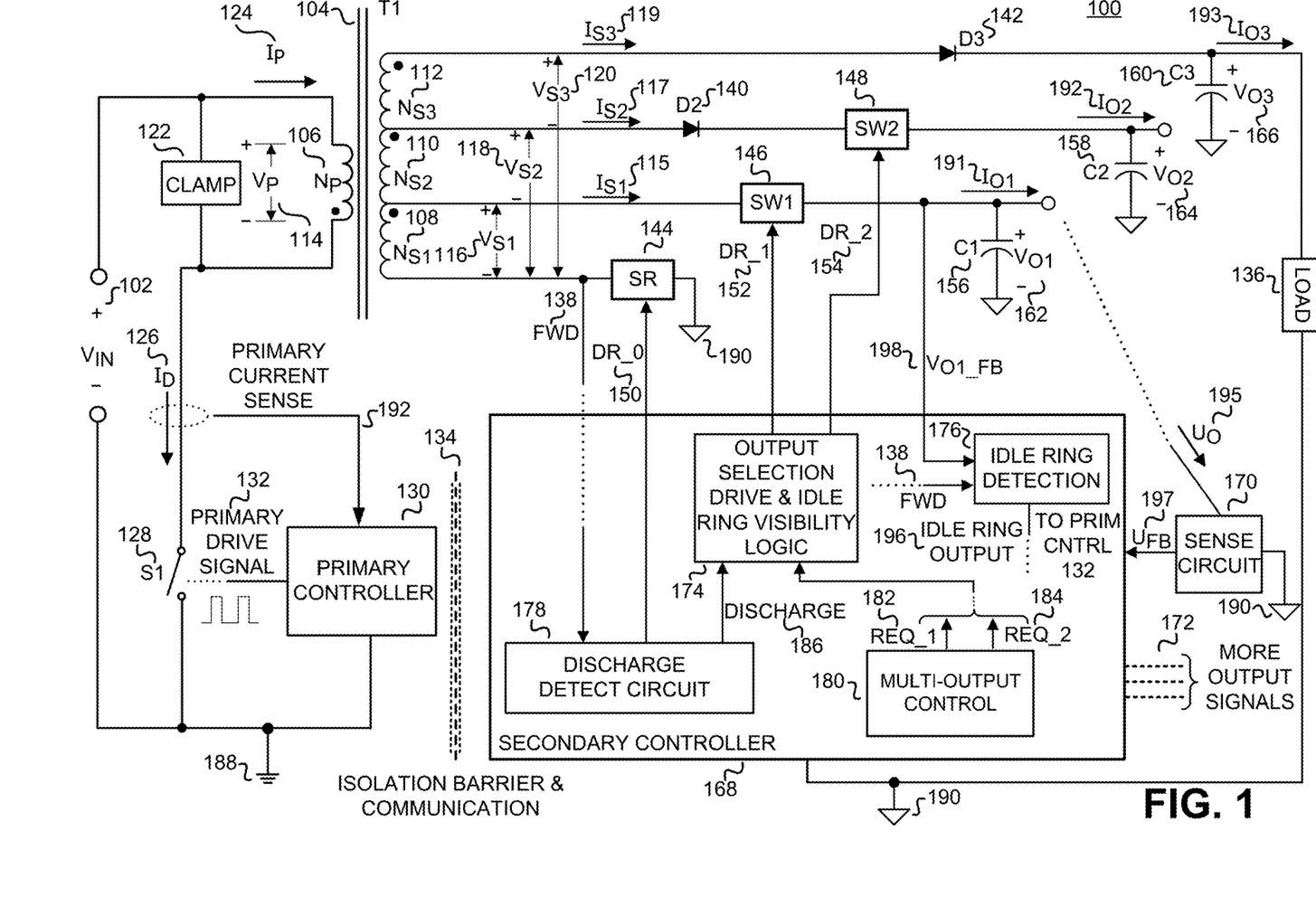
FIG. 1 illustrates an example implementation of an example multi-output power converter with switches and including an example idle ring detection/visibility block in accordance with the teachings of the present invention.

To illustrate, FIG. 1 depicts an example implementation of an example multi-output power converter with switches and including an example idle ring detection/visibility block in accordance with the teachings of the present invention. In particular, FIG. 1 is a functional block diagram illustrating one example of a dc-dc power converter 100 that receives an input voltage $V_{IN}$ 102 to produce multiple (e.g., three) output voltages $V_{O1}$ 162, $V_{O2}$ 164, and $V_{O3}$ 166, which are positive with respect to an output return 190. The power converter 100 is shown to produce the output voltage $V_{O3}$ 166, an output current $I_{O3}$ 193 to a load 136. In one example, the output voltages $V_{O1}$ 162 and $V_{O2}$ 164 may also be coupled to drive loads (not shown in FIG. 1) with output currents $I_{O1}$ 191 and $I_{O2}$ 192, respectively. In an example of an ac-dc power converter, the dc input voltage $V_{IN}$ 102 may be a rectified and filtered ac input voltage. Input voltage $V_{IN}$ 102 is positive with respect to an input return 188. It may be appreciated by one of ordinary skill in the art having the benefit of the present disclosure, that other embodiments of power converter 100 of FIG. 1 may include an arbitrary number of multiple outputs ("n" number of outputs) to produce multiple output voltages and multiple output currents at multiple number of loads in accordance with the teachings of the present invention.

The example power converter 100 of FIG. 1 is a regulated flyback converter. As shown, the power converter 100 includes energy transfer element T1 104, which in a flyback converter is a coupled inductor. A coupled inductor is sometimes referred to as a transformer. From here on throughout the specification the energy transfer element T1 104 may be referred to as a transformer.

FIG. 1 is illustrated to include a primary winding 106 with $N_P$ turns, and three secondary windings 108 with $N_{S1}$ turns, 110 with $N_{S2}$ turns, and 112 with $N_{S3}$ turns of the energy transfer element T1 104, a switch S1 128, input return 188, a clamp circuit 122, output switches SW1 146 and SW2 148, a synchronous rectifier (SR) 144, diodes D2 140 and D3 142, output capacitors C1 156, C2 158, and C3 160, a load 136, a sense circuit 170, a clamp circuit 122, a primary controller 130, a secondary controller 168, and an isolation barrier and communication 134 between the primary controller 130 and secondary controller 168. Other examples may include multiple secondary windings to drive multiple loads at different or same output voltages and output currents. Also shown in FIG. 1 are primary voltage $V_P$ 114, primary current $I_P$ 124, a primary current sense signal 194, a primary drive signal 132, secondary currents $I_{S1}$ 115, $I_{S2}$ 117, $I_{S3}$ 119, and secondary voltages $V_{S1}$ 116, $V_{S2}$ 118, and $V_{S3}$ 120.

As shown in the depicted example, the primary controller 130 controls the primary switch S1 128 via a primary drive signal 132 to control the transfer of energy to the secondary side. The primary controller 130 may also be responsive to the primary current sense signal 194, which indicates the value of primary switch current ID 126 in primary switch S1 128. Any of the several ways practiced in the art to sense current in a switch may be utilized to provide the primary current sense signal 194. In other examples, the primary switch S1 128 may be a metal oxide semiconductor field effect transistor (MOSFET), or a bipolar junction transistor (BJT), or an insulated gate bipolar transistor (IGBT), or any other suitable type of switch. In one example, the primary controller 130 and the primary switch S1 128 may be integrated in an integrated circuit chip.

The secondary controller 168 further includes, an output selection drive and idle ring visibility logic 174, an idle ring detection 176, a discharge detect circuit 178, and multi-output signal process and interface blocks. The secondary controller 168 is coupled to receive a feedback signal $U_{FB}$ 197 from the sense circuit 170, which is coupled to receive an output signal $U_O$ 195 from one of the outputs. The secondary controller 168 controls the SR 144 via a drive signal DR_0 150 to transfer energy to the multiple outputs. The output switches SW1 146 and SW2 148 are also coupled to be driven by the secondary controller 168 via drive signals DR_1 152 and DR_2 154.

The discharge detect circuit 178 is coupled to receive the secondary winding voltage via a signal FWD 138 and coupled to output a DISCHARGE signal 186 to the output selection drive and idle ring visibility logic block 174. The multi-output signal process and interface block 180 is coupled to output request signals REQ_1 182 and REQ_2 184 to the output selection drive and idle ring visibility logic block 174, which is further coupled to output the drive signals DR_1 152 and DR_2 154 to the output switches SW1 146 and SW2 148, respectively. The discharge detect circuit 178 is coupled to control the switching of the SR 144 via the signal DR_0 150. A first terminal of the output switch SW1 146 is coupled to the secondary winding 110. The idle ring detection block 176 is coupled to receive the FWD signal 138, and is coupled to a second terminal of the output switch SW1 146.

In one example, the output switch SW1 146 is enabled during an idle period of the power converter 100 to observe an idle ring of the secondary voltage at the FWD signal 138 in accordance with the teachings of the present invention. An idle period of the converter may be referred to as, or detected by, a secondary discharge end time, which may be indicated by the low value of DISCHARGE signal 186 output by the discharge detect circuit 178. In the illustrated example, a high value of the DISCHARGE signal 186 may indicate the start of secondary discharge time, and a low value of the DISCHARGE signal 186 may indicate the end of secondary discharge time. In other examples, a low value of the DISCHARGE signal 186 may indicate the start of secondary discharge time, and a high value of the DISCHARGE signal 186 may indicate the end of secondary discharge time. In the illustrated example, the start and end of the secondary discharge time may be detected in response to the secondary winding voltage signal FWD 138. In one example, FWD 138 may be a terminal coupled to the secondary winding 108. Any well-known methods in the art for calculating discharge time may be used to realize the discharge detect circuit. For instance, in one example, at the beginning of a new switching cycle, when the magnetic element T1 104 is charging, one of the outputs of $V_{O1}$ 162 or $V_{O2}$ 164 may be selected by enabling either output switch SW1 146 or SW2 148. The output $V_{O3}$ 166 may be selected by enabling neither of the output switches SW1 146 or SW2 148. After being charged to a maximum voltage, the magnetic element T1 104 begins to discharge. The discharge start time of the secondary may be indicated by a high value of the discharge signal DISCHARGE 186 which causes the SR 144 to be turned on via DR_0 150.

In one example, the discharge detect circuit 178 makes the discharge signal DISCHARGE 186 low when the secondary winding begins to discharge. At the end of discharge time, the output selection drive and idle ring visibility logic block turns on the output switch SW1 146 to enable idle ring visibility at the output $V_{O1}$ 162. In other words, when the signal DISCHARGE 186 is high, the output selection drive and idle ring visibility logic block 174 may enable either switch SW1 146 or SW2 148 or neither in response to the request signals REQ_1 182 and REQ_2 184. When the signal DISCHARGE 186 is low, only the switch SW1 146 is enabled to observe the idle ring output. In other examples, more than one of the output switches may be enabled to observe the idle ring. Also in other examples, the start secondary discharge may be indicated by a low value of the signal DISCHARGE 186, and the end of secondary discharge may be indicated by a high value of the signal DISCHARGE 186. In one example the high and low values of the signal DISCHARGE 186 are logic high and logic low, respectively.

In one example, the idle ring detection block 176 is coupled to receive the FWD signal 138 and a $V_{O1\_FB}$ signal 198. The idle ring detection block 176 is coupled to output an idle ring output signal 196 in response to a comparison of the FWD signal 138 and the $V_{O1\_FB}$ signal 198. In one example, the idle ring output signal 196 may be coupled to be received by a timing circuit (not shown) to generate the next request pulse from the secondary controller 168 to the primary controller 130.

Figure 2:
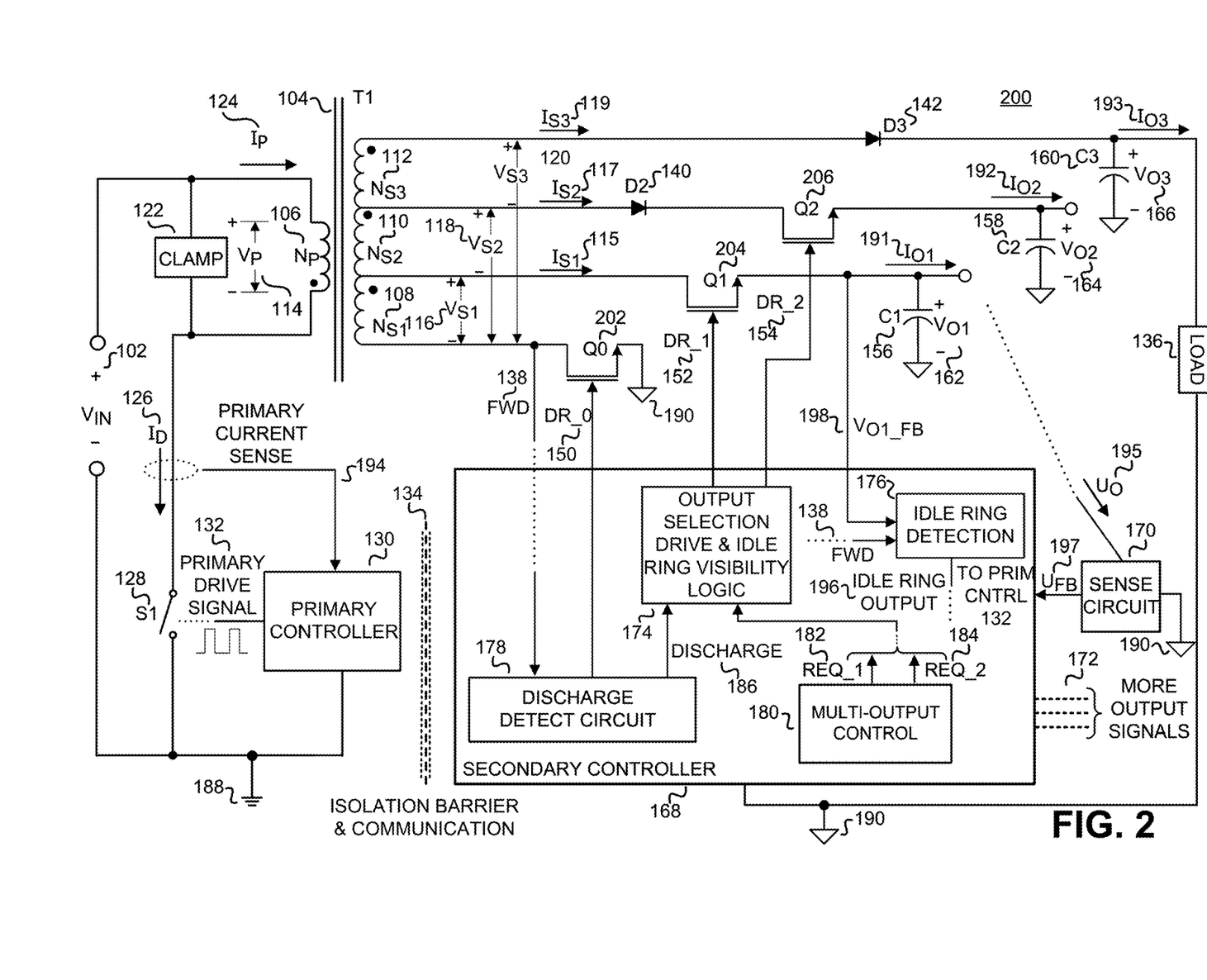
FIG. 2 illustrates an example implementation of an example multi-output power converter with a transistor and including an example idle ring detection/visibility block in accordance with the teachings of the present invention.

FIG. 2 is a functional block diagram illustrating one example of a dc-dc power converter 200 similar to the power converter 100 of FIG. 1. A difference between the power converter 100 and 200 is that the power converter 200 includes a transistor Q0 202 in place of SR 144 of FIG. 1, a transistor Q1 204 in place of SW1 146, and Q2 206 in place of SW2 148. All the other similarly named circuit elements are coupled and work in a similar fashion as in FIG. 1.

Referring to the transistor Q0 202, its gate is coupled to receive a drive signal DR_0 150 to transfer energy to the multiple outputs. The drain of the transistor Q0 202 is coupled to one end of the secondary winding 108 and the source of the transistor Q0 202 is coupled to the output return 190. Similarly, the gates of transistors Q1 204 and Q2 206 are coupled to receive signals DR_1 152 and DR_2 154 by the output selection drive and idle ring visibility logic block 174. The transistors Q0 202, Q1 204, and Q2 206 are shown to be MOSFETs, but can be BJTs or IGBTs in other examples.

Figure 3:
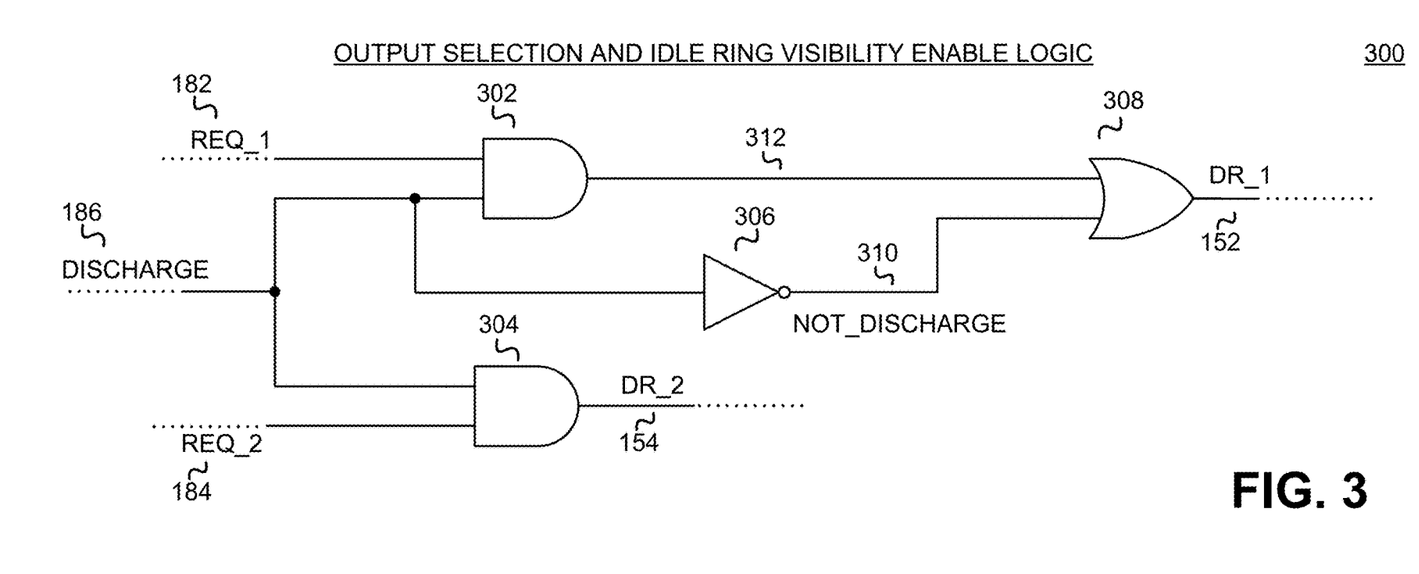
FIG. 3 illustrates an example implementation of an output selection drive and idle ring visibility logic block included in a power converter of FIG. 1 or FIG. 2 in accordance with the teachings of the present invention.

FIG. 3 illustrates an example implementation of an output selection drive and idle ring visibility logic block 300, which may be an example of the output selection drive and idle ring visibility logic block 174 included in the power converter examples depicted in FIG. 1 or FIG. 2 in accordance with the teachings of the present invention. As shown in FIG. 3, the output selection drive and idle ring visibility logic block 300 includes AND gates 302, 304, an inverter 306, and an OR gate 308. The AND gate 302 is coupled to receive the signals REQ_1 182 and DISCHARGE 186. The AND gate 304 is coupled to receive the signals REQ_2 184 and DISCHARGE 186. The inverter 306 is coupled to receive the signal DISCHARGE 186 and coupled to output a signal NOT_DISCHARGE 310 to an input of the OR gate 308. The output of the OR gate 308 is coupled to generate the signal DR_1 152, which drives the output switch SW1 146 as shown in FIG. 1, or transistor Q1 204 as shown in FIG. 2. The output of the AND gate 304 is coupled to generate the signal DR_2 154, which drives the output switch SW2 148 or transistor Q2 206 as shown in FIG. 2.

The disclosed example circuit of the output selection drive and idle ring visibility logic turns on the either SW1 146 (or transistor Q1 204) or SW2 148 (or transistor Q2 206) during the secondary charge time and enables only SW1 146 (or transistor Q1 204) at the end of secondary discharge time to enable the idle ring visibility in accordance with the teachings of the present invention.

Figure 4:
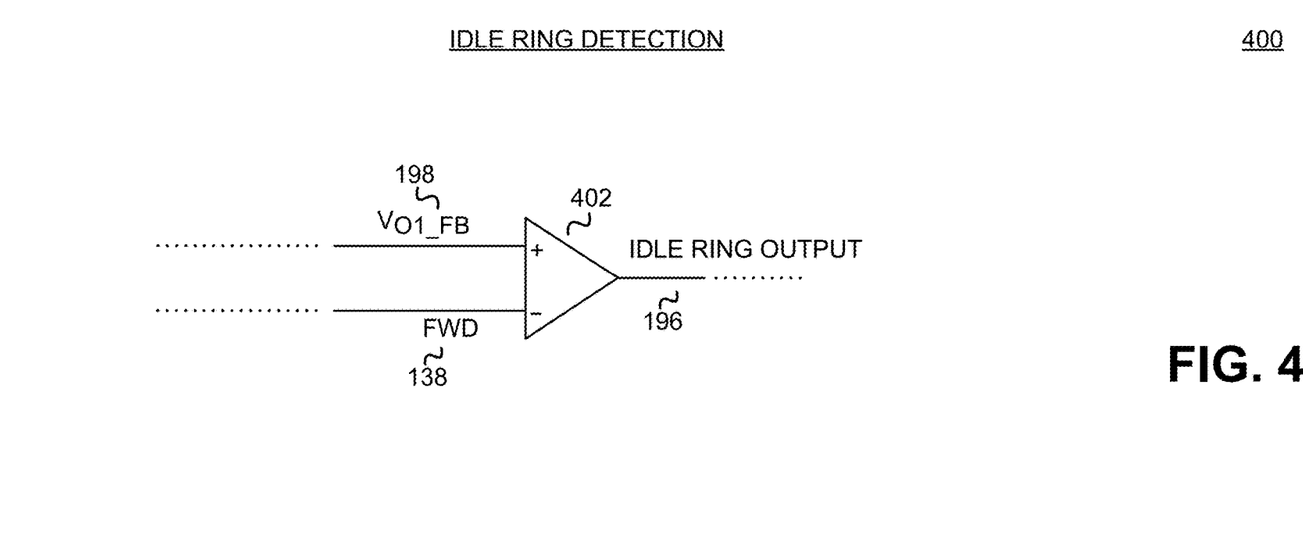
FIG. 4 illustrates an example implementation of an idle ring detection block included in a power converter of FIG. 1 or FIG. 2.

FIG. 4 illustrates an example implementation of an idle ring detection block 400, that may be an example of the idle ring detection block 176 included in a power converter of FIG. 1 or FIG. 2. As shown in the example depicted in FIG. 4, idle ring detection block 400 includes an op-amp comparator 402. A non-inverting terminal of the op-amp comparator 402 is coupled to receive the signal $V_{O1\_FB}$ 198, which is coupled to the output $V_{O1}$ 162 as shown in FIG. 1 or FIG. 2. An inverting terminal of the op-amp comparator 402 is coupled to receive the signal FWD 138. The output the op-amp comparator 402 is coupled to generate the idle ring output 196 signal, which may be coupled to be received by a timing circuit (not shown) to generate the next request pulse from the secondary controller 168 to the primary controller 130 as shown in FIG. 1 or FIG. 2. In one example, the idle ring output 196 signal may be used to achieve secondary peak switching or primary valley switching operation. In other examples the idle ring output 196 signal may also be used for some other purpose.

Figure 5:
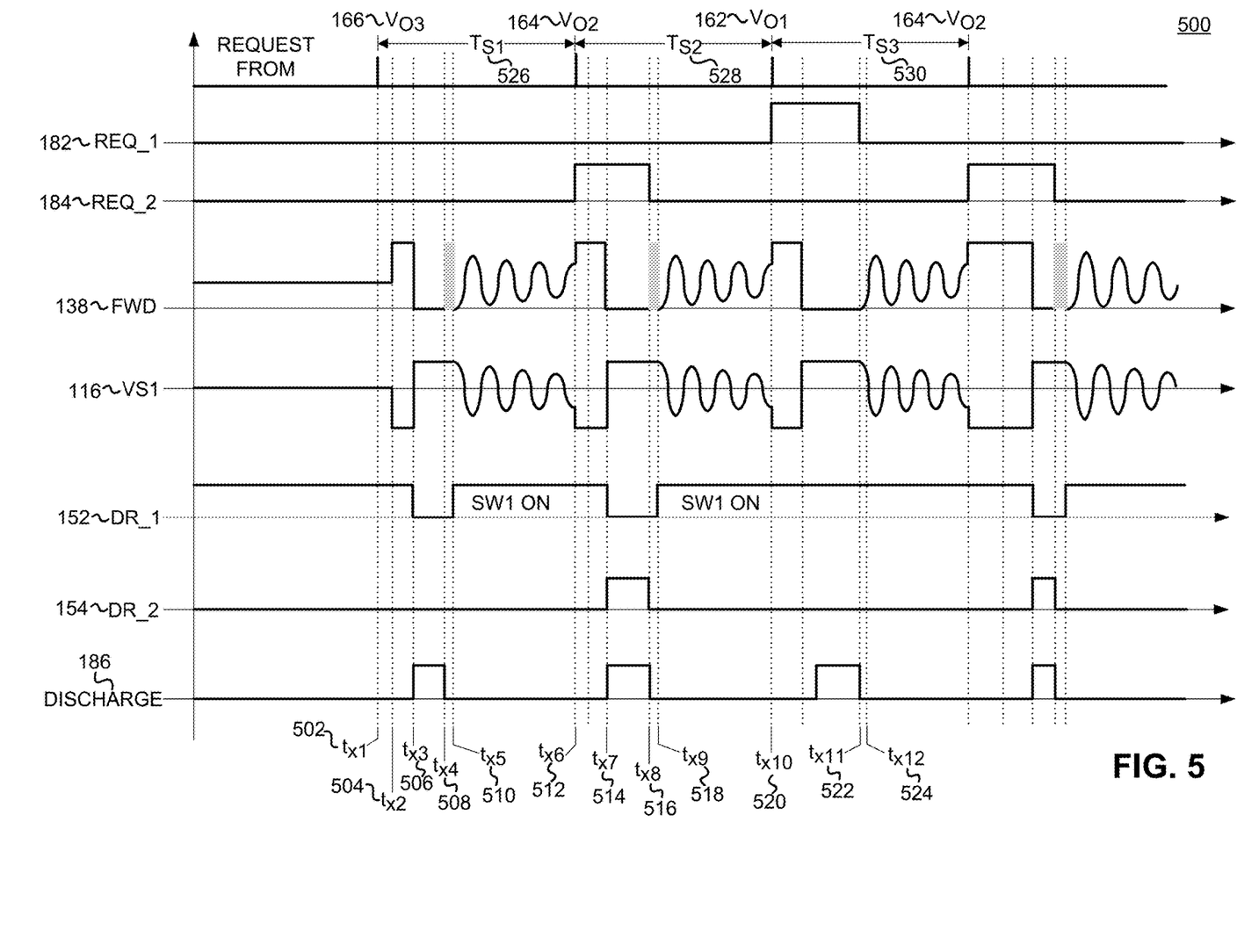
FIG. 5 illustrates timing diagrams of various input and output signals of the power converters of FIG. 1 or FIG. 2 with and without idle ring visibility in accordance with the teachings of the present invention.

FIG. 5 illustrates timing diagrams of various input and output signals of the power converters 100 of FIG. 1 or 200 of FIG. 2 with and without idle ring visibility in accordance with the teachings of the present invention. The waveforms illustrated in FIG. 5 include REQ_1 182, REQ_2 184, FWD 138, VS1 116, DR_1 152, DR_2 154, and DISCHARGE 186. As shown, three complete switching cycles $T_{S1}$ 526, $T_{S2}$ 528, and $T_{S3}$ 530 are illustrated in FIG. 5.

As can be seen at time $t_{x1}$ 502, the output $V_{O3}$ 166, may be requesting energy due to a loading condition. At time $t_{x2}$ 504, the signal FWD 138 goes high indicating a beginning of primary conduction. At this time, primary switch S1 128 is turned on producing a current in the secondary winding 108. At time $t_{x2}$ 504, the secondary voltage $V_{S1}$ 116 goes low. At time $t_{x3}$ 506, the secondary voltage $V_{S1}$ 116 and the signal DISCHARGE 186 go high indicating the start of a secondary discharge. At time $t_{x4}$ 508, the signal FWD 138 approaches zero indicating the end of discharge. At time $t_{x5}$ 510, the secondary controller 168 makes the signal DR_1 152 high to turn on the output switch SW1 146, which remains on until the time $t_{x7}$ 514. From the time $t_{x5}$ 510 to $t_{x6}$ 512, an idle ring may be observed as signal VS1 116 in accordance with the teachings of the present invention.

At the beginning of the second switching cycle $T_{S2}$ 528, the signal FWD 138 goes high again. After the beginning of the second switching cycle $T_{S2}$ 528, the signal REQ_2 184 goes high following which the secondary controller 168 turns on the output switch SW2 148 by making the signal DR_2 154 high at time $t_{x7}$ 514. The signal DISCHARGE 186 goes high at time $t_{x7}$ 514, and goes low at $t_{x8}$ 516. At time $t_{x9}$ 518, the signal DR_1 152 is made high again to turn on the output switch SW1 146, which enables the idle ring visibility on VS1 116 at time $t_{x9}$ 518 until the end of the second switching cycle $T_{S2}$ 528 in accordance with the teachings of the present invention.

During the third switching cycle $T_{S3}$ 530, the output switch SW1 144 remains on in response to a request from the output $V_{O1}$ 162. At time $t_{X11}$ 522, the DISCHARGE signal 186 goes low and the signal DR_1 152 remains high keeping the switch SW1 144 on for idle ring visibility in accordance with the teachings of the present invention.

Figure 6:
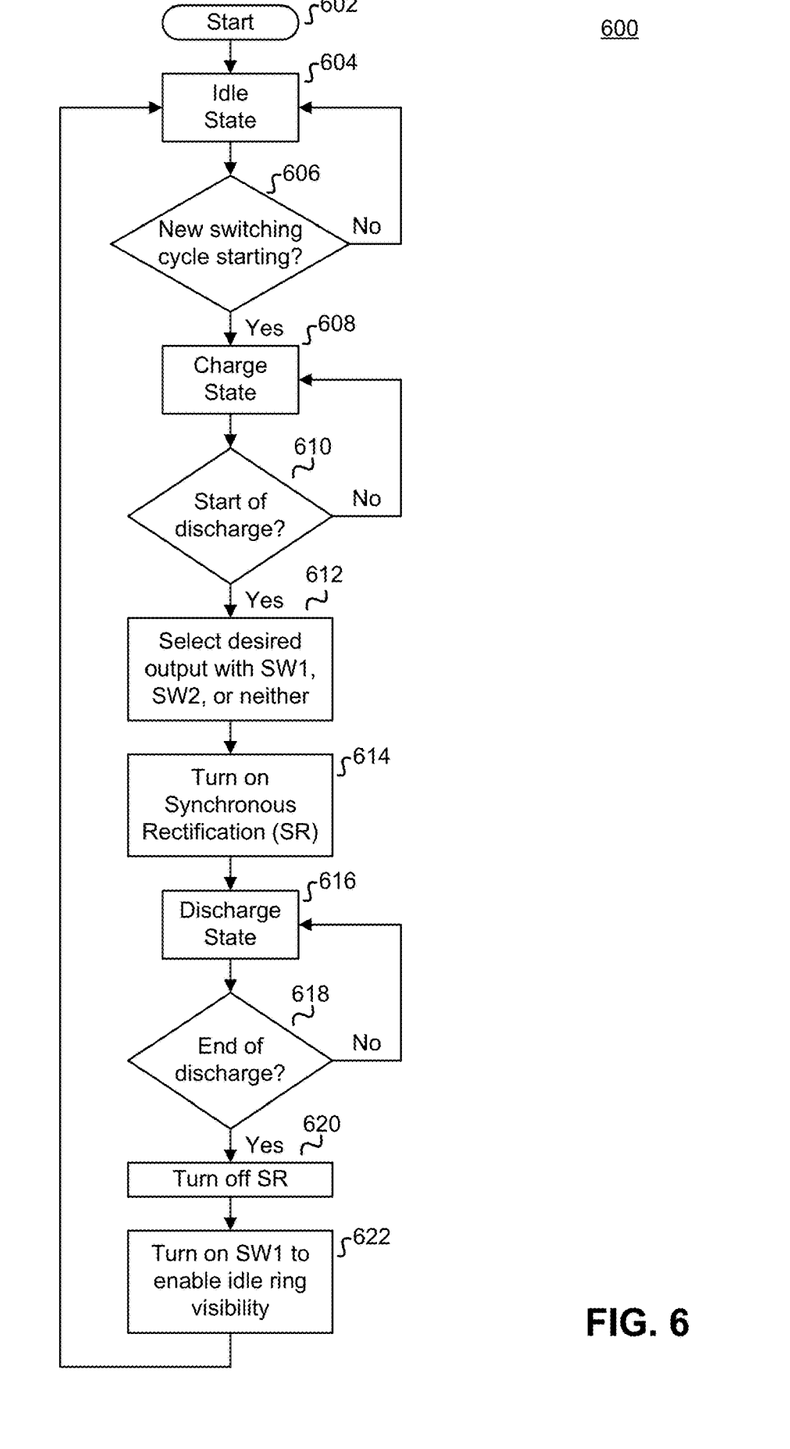
FIG. 6 illustrates an example flow diagram of various input and output signals of the power converters of FIG. 1 or FIG. 2 with and without idle ring visibility in accordance with the teachings of the present invention.

FIG. 6 illustrates an example flow diagram of various input and output signals of the power converters of FIG. 1 or FIG. 2 with and without idle ring visibility in accordance with the teachings of the present invention.

After starting at block 602, the controller may enter an idle state at block 604. At the end of the idle state, it may be checked at block 606 if a new switching cycle is starting. If a new switching cycle is starting, then the process proceeds to block 608. If not, then the process goes back to the idle state at block 604. At the end of block 606, the process enters the charge state at block 608. At the end of the block 608, the process proceeds to block 610.

At block 610, it may be detected if the secondary discharge has started. If so, then the process proceeds to block 612. If not, then the process remains in the charge state at block 608.

At block 612, a desired output may be selected via the output switch SW1 or SW2 or neither.

At block 614, the synchronous rectifier may be turned on. At the end of block 614, the process proceeds to block 616. At block 616, the process enters a discharge state and then moves to block 618.

At block 618, it may be checked if the end of discharge is detected or not. If so, then the process moves to the next block 620, otherwise the process moves to block 616.

At block 620, the SR may be turned off. At the end of block 620, the process moves to the block 622.

At block 622, the output switch SW1 may be turned on to enable idle ring visibility. At the end of block 622, the process proceeds to the idle state at block 604.

The order in which some or all of the process blocks appear in process 600 should not be deemed limiting. Rather, one of ordinary skill in the art having the benefit of the present disclosure will understand that some of the process blocks may be executed in a variety of orders not illustrated, or even in parallel.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A method of controlling multiple outputs of a secondary controller in a power converter, the method comprising:
    switching a primary switch according to a switching cycle;
    receiving a voltage signal from a transformer winding;
    providing a discharge signal in response to the voltage signal from the transformer winding;
    providing output request signals to an output selection drive and idle ring visibility logic circuit;
    controlling a first output switch and a second output switch in response to the discharge signal and the output request signals;
    detecting an idle period of the power converter from the discharge signal;
    turning on the first output switch in response to detecting the idle period of the power converter based on the voltage signal from the transformer winding; and
    generating a next request pulse from the secondary controller to a primary controller.

2. The method of claim 1, further comprising:
    receiving the discharge signal and the output request signals at the output selection drive and idle ring visibility logic circuit.

3. The method of claim 1, further comprising:
    driving a synchronous rectifier, the synchronous rectifier coupled to the transformer winding.

4. The method of claim 1, wherein receiving the voltage signal from the transformer winding comprises:
    receiving the voltage signal at a discharge detect circuit.

5. The method of claim 4, wherein providing the discharge signal in response to the voltage signal from the transformer winding comprises:
    providing the discharge signal from the discharge detect circuit.

6. The method of claim 1, wherein providing output request signals to the output selection drive and idle ring visibility logic circuit comprises:
    providing output request signals from a multi-output signal process and interface block.

7. The method of claim 1, wherein controlling the first output switch and the second output switch comprises:
    providing a first drive signal to a control terminal of the first output switch; and
    providing a second drive signal to a control terminal of the second output switch.

8. The method of claim 7, wherein providing the first drive signal to the control terminal of the first output switch comprises:
    providing the first drive signal from the output selection drive and idle ring visibility logic circuit.

* * * * *